(12) United States Patent
McKeeby et al.

(10) Patent No.: US 6,311,985 B1
(45) Date of Patent: Nov. 6, 2001

(54) INTEGRAL YOKE AND SLINGER

(75) Inventors: Steven Daniel McKeeby, Lawton; Dale Lee Kwasniewski, Galesburg; Michael Anthony Chamberlin, Richland, all of MI (US)

(73) Assignee: Spricer Technologies, Inc., Ft. Wayne, IN (US)

( * ) Notice: Subject to any disclaimer, the term of this patent is extended or adjusted under 35 U.S.C. 154(b) by 0 days.

(21) Appl. No.: 09/340,059

(22) Filed: Jun. 28, 1999

(51) Int. Cl.⁷ .................................................... F16J 15/42
(52) U.S. Cl. ........................ 277/423; 277/424; 277/562; 464/133
(58) Field of Search ................................. 277/423, 424, 277/562, 565, 566; 464/133, 134, 905

(56) References Cited

U.S. PATENT DOCUMENTS

| | | |
|---|---|---|
| 1,145,516 | 7/1915 | Schmid-Roost . |
| 1,207,759 | 12/1916 | Huff . |
| 3,053,541 | 9/1962 | Dega . |
| 3,476,396 | 11/1969 | Buhl . |
| 3,482,844 | 12/1969 | McKinven . |
| 4,314,705 | 2/1982 | Shimizu . |
| 4,427,202 * | 1/1984 | Backlin ................................ 277/424 |
| 4,531,746 | 7/1985 | Amdall et al. . |
| 5,687,973 | 11/1997 | Ruppert, Jr. . |
| 5,895,052 * | 4/1999 | Drucktenhengst et al. ......... 277/424 |
| 5,979,903 * | 11/1999 | Kwasniewski ....................... 277/423 |

* cited by examiner

Primary Examiner—Anthony Knight
Assistant Examiner—Enoch E. Peavey
(74) Attorney, Agent, or Firm—Liniak, Berenato, Longacre & White

(57) ABSTRACT

An integral yoke/slinger assembly replaces a conventional two-piece design. The integral yoke/slinger arrangement provides a new and improved shaft seal particularly adapted for use in yoke and flange arrangement exposed to a heavy concentration of air entrained foreign material, whereby a more efficient and economical method for manufacturing and assembling a yoke, slinger and seal arrangement for a drive axle system is provided.

16 Claims, 4 Drawing Sheets

INTEGRAL YOKE AND SLINGER

BACKGROUND OF THE INVENTION a) Field of the Invention

This invention pertains to improvements in shaft seals and particularly to an arrangement that is adapted for use with a pair of relatively rotatable parts to prevent the ingress of dust dirt and other foreign matter and the egress of fluid from within the area confined by the rotatable parts.

b) Description of Related Art

In seal applications particularly in the automotive and heavy-equipment fields where the operating environment contains a high concentration of foreign abrasive matter such as dust dirt and the like, it is advantageous to provide a secondary or dust excluding element to protect the primary sealing element. Seal failure is often due to abrasion by dust and dirt entering the seal and causing the seal to wear away.

During normal operation of a drive axle and yoke arrangement, a seal prevents oil from is escaping the transmission and keeps dirt, water or other foreign material from entering the transmission. Conventional drive axle yokes systems use a slinger arrangement to improve the cleanliness and life of the seal, and these drive axle yokes use a slinger that is pressed onto a diameter of the yoke, and often tack welded in place. Such slingers are used to keep debris away from the oil seal areas. Typically, the slinger is stamped of thin gage material.

There exists a need however for an effective and economical yoke and slinger design having reduced costs and manufacturing time, without sacrificing the systems ability to keep the oil seal areas free of debris.

SUMMARY OF THE INVENTION

The present application proposes a unique solution providing an integral yoke and slinger arrangement machined from the same forging. The integral yoke/slinger assembly may be used in place of the current two-piece design.

This invention provides a new and improved shaft seal particularly adapted for use in yoke and flange arrangement exposed to a heavy concentration of air entrained foreign material. It is an object of this invention to provide a new and improved shaft sealing arrangement which due to its unique design provides a more efficient and economical method for manufacturing and assembling a yoke, slinger and seal arrangement for a drive axle system.

Additional objects other than those specifically enumerated will become apparent in the course of the following description of some preferred embodiments while other modifications will be clearly apparent to one of skill in the art who reads the description and studies the drawings.

DETAILED DESCRIPTION OF THE PREFERRED EMBODIMENT

The present invention provides an improved drive axle yoke 10 which eliminates the need for a separately manufactured slinger which is conventionally press fit onto the yoke in the conventional design. As illustrated in Prior Art FIGS. 5a and 5b, the conventional slinger 14 is stamped from thin gage material and press fit onto a diameter of the yoke 10 and tack welded in place to thereby provide additional protection for the seal.

Figure 1:
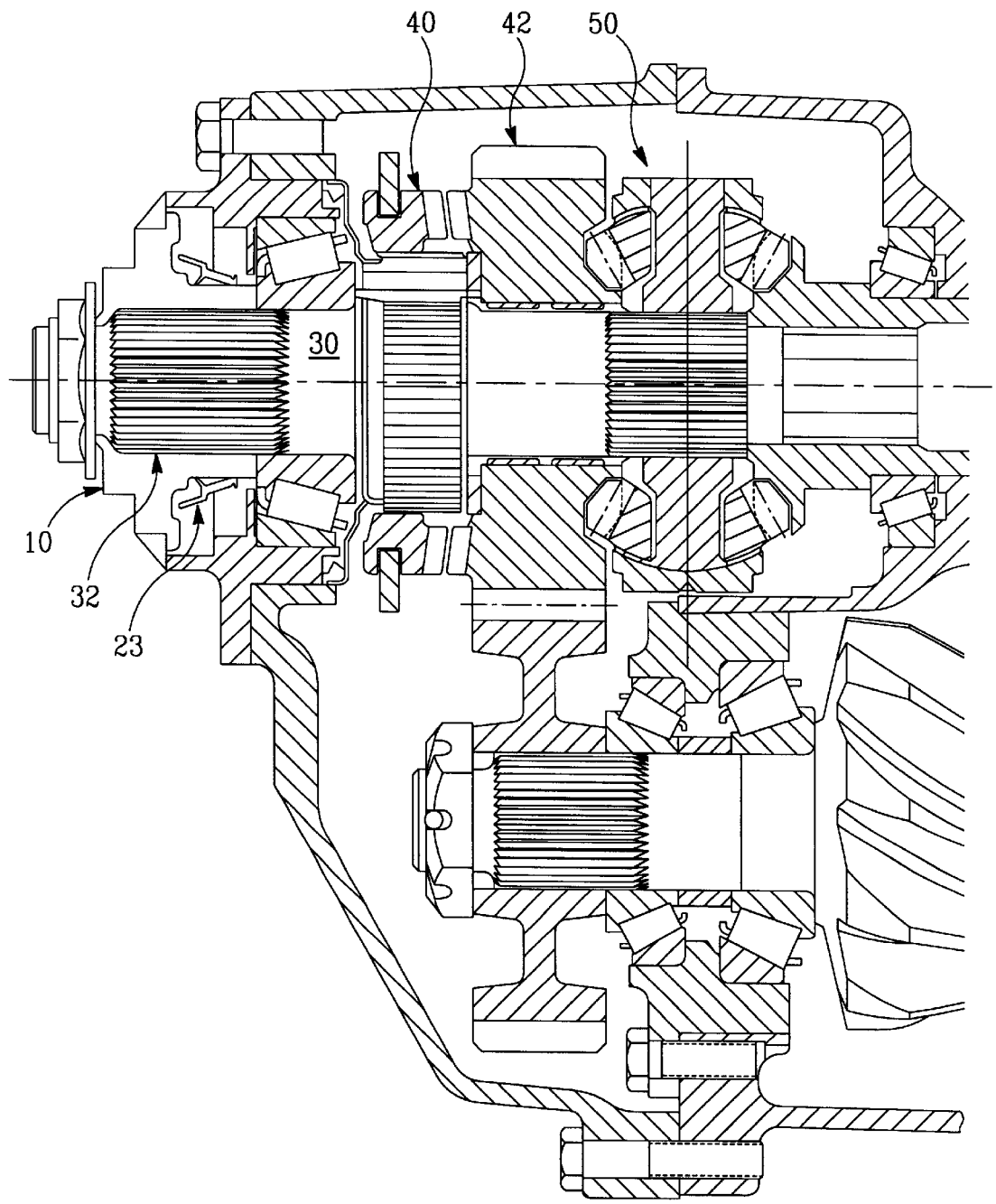
FIG. 1 is a cross sectional view of the shaft sealing arrangement of the present invention as incorporated into a power take-off system.

The assembly of FIG. 1 present a typical application of a drive axle having an input yoke 10 which receives an input torque and transmits that input torque to the axle 30 via splines 32. The torque is then transferred through differential 50 to the gear 42 in a manner that is well known in the art. The input yoke 10 is mounted for driving rotation on the shaft 30. The sealing arrangement closes off the space between the housing 18 and the shaft 30 and includes a sealing element or member 23 disposed on the external diameter of the yoke 10 and a slinger 14 is disposed adjacent the seal member 23 to provide protection to the seal member 23 against debris.

Figure 5A:
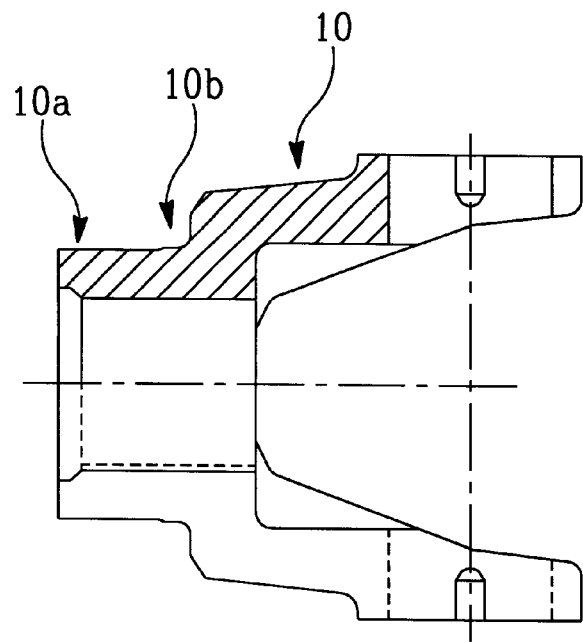
FIGS. 5a and 5b are illustrations of the prior art yoke and slinger arrangement.
Figure 5B:
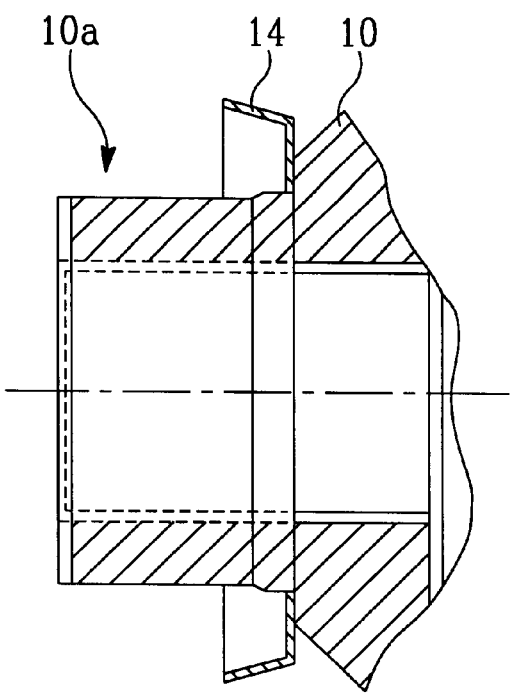

As illustrated by FIGS. 5a and 5b, the conventional yoke is formed with a reduced-diameter portion 10a and a stepped region 10b. The slinger 14 is press-fit onto the reduced-diameter portion 10a and against the raised wall of the steeped region 10b.

Figures 2, 3:
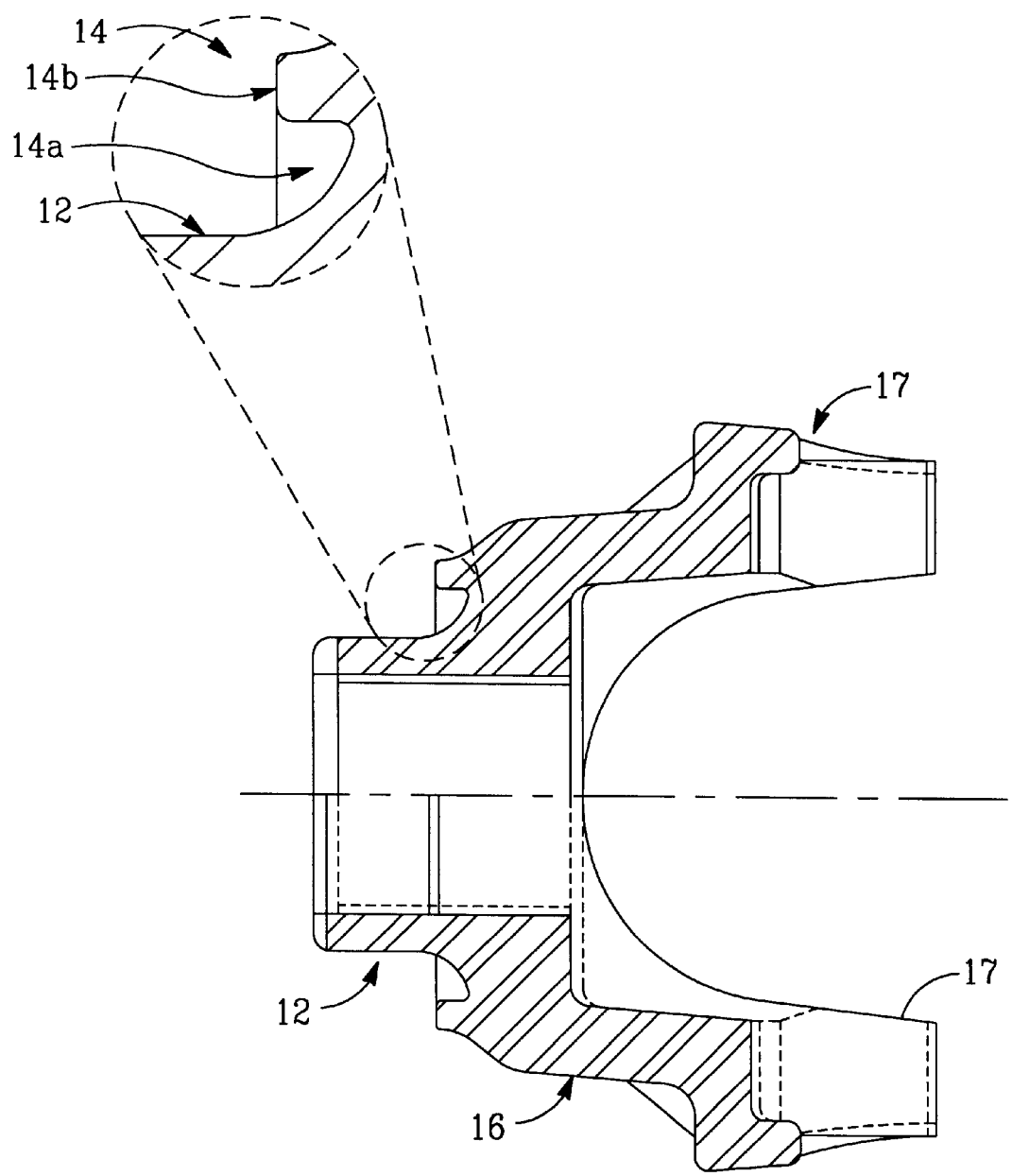
FIG. 2 is a partial cross-sectional view of the integral yoke/slinger design of the present invention.
FIG. 3 is an enlarged view of the partial cross-sectional view of FIG. 1 showing the integral yoke and slinger.

The present invention focuses on the arrangement of an integral yoke 10 and slinger 14 that is integrally formed, that is, yoke 10 and slinger 14 are machined from the same forging. As shown in FIGS. 2 and 3, the seal member is disposed on an external diameter of the generally annular first portion 12 of the yoke 10. Internally splines 13 are generally provided on the internal surface of the first portion 12. The enlarged connecting portion 16 of the yoke 10 is generally formed with connecting forks 17 of a constant velocity joint provided to transmit torque from an input drive system to the transmission shaft or axle 30 as generally shown in FIG. 1. Of course, the integral yoke and slinger design of this invention may be employed in a wide variety of transmission systems where a yoke, slinger and seal system is employed.

Figure 4:
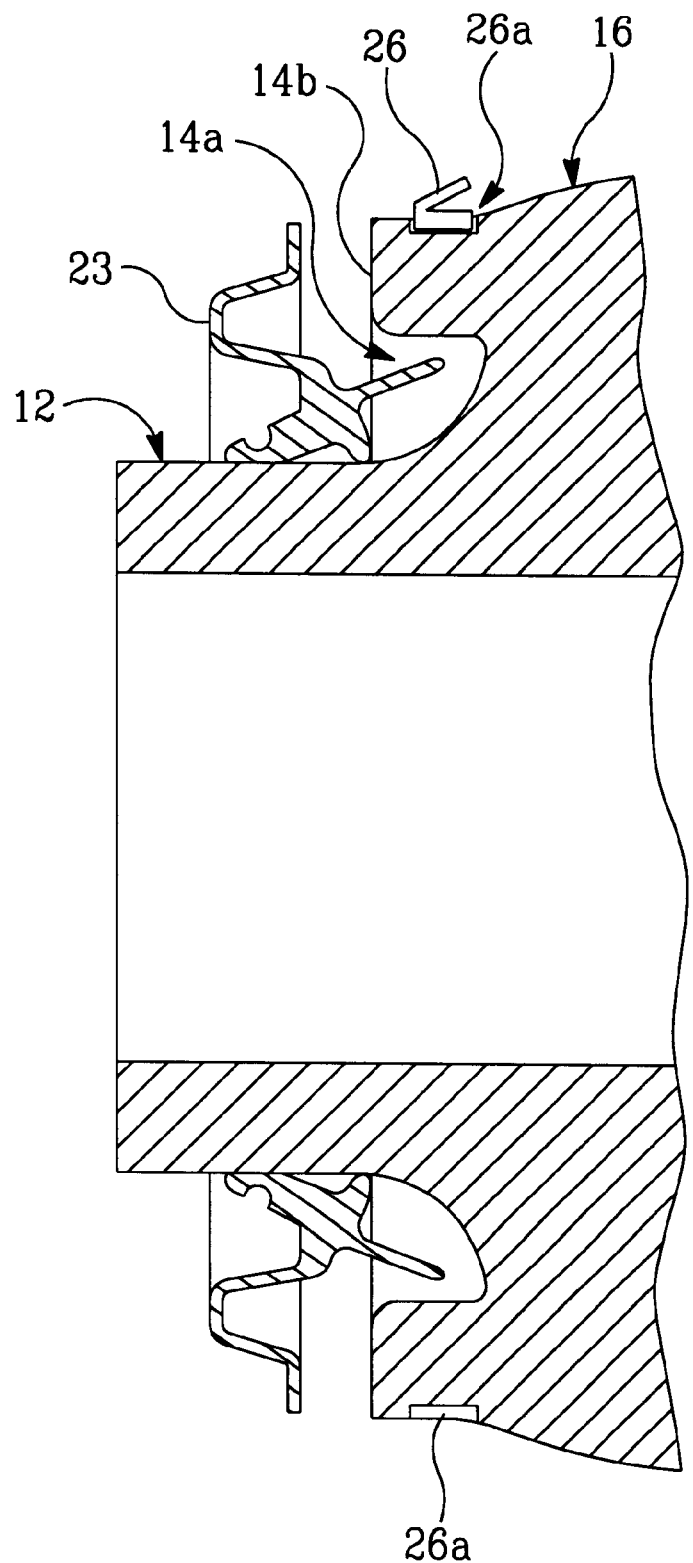
FIG. 4 is an enlarged view of the integral yoke/slinger design with a seal member position adjacent thereto.

As clearly illustrated by FIGS. 2 and 3, the slinger portion 14 of the yoke 10 is formed with a circumferential groove 14a defined by the lip 14b that extends in the axial direction toward the seal member 23 (see FIG. 4). As shown in FIG. 4, the seal member itself may project, at least in part, into the circumferential groove 14a to provide enhanced protection for the seal member 23 against debris.

The slinger portion 14 of the yoke 10 may take a variety of forms. The form shown in FIGS. 2 and 3 have been shown to generate sufficient turbulence to deflect large particles, stones, rocks as well as other smaller debris which would normally injure or deteriorate the seal member 23. However, the projecting lip 14b defining the slinger portion 14 may be machined into other forms suitable for a wide variety of seal designs and transmission applications. Further, a V-ring type seal 26 may be disposed on an outer periphery of the yoke and slinger design. V-ring type seals of this type account for forging limitations; forging diameter 'D' may not be large enough for all axle bearing housings, therefore, a V-ring seal 26 disposed within groove 26a may be required for ultimate exclusion of road debris.

While the foregoing invention has been shown and described with reference to a preferred embodiment, it will be understood by those of skill in the art that various changes in form and detail may be made therein without departing from the spirit and scope of the instant invention.

What is claimed is:

1. An axle yoke for transmitting a torque to an axle, said axle yoke defining an axial direction and comprising:

a forged body having a generally annular first portion for receiving an axle therein and an enlarged connecting portion for connecting said forged body to a drive system, wherein said forged body comprises a slinger portion integrally and unitarily forged therewith for deflecting debris away from a seal member disposed on an outer diameter of said generally annular first portion.

2. The axle yoke of claim 1, wherein said slinger portion is defined by a lip projection from said enlarged connecting portion in said axial direction.

3. The axle yoke of claim 1, wherein said slinger portion is defined by a circumferential groove formed into said enlarged connecting portion of said axle yoke along the axial direction.

4. The axle yoke of claim 3, further comprising a separately disposed seal member sealing disposed on an exterior diameter of said generally annular first portion adjacent said slinger portion.

5. The axle yoke of claim 4, wherein said seal member is partially disposed within said circumferential groove.

6. The axle yoke of claim 1, wherein said generally annular first portion is formed with internal splines adapted to mate with external splines of an axle shaft.

7. The axle yoke of claim 1, wherein said enlarged connecting portion is formed with connecting forks of a constant velocity joint.

8. The axle yoke of claim 1, wherein said slinger portion is formed on an exterior of said forged body along said axial direction at a transition from said generally annular first portion to said enlarged connecting portion.

9. A combination axle yoke, slinger and seal arrangement for both transmitting a torque to an axle and sealing a housing member of said axle, said axle yoke defining an axial direction and comprising:

a forged body having a first portion for receiving said axle therein and an enlarged connecting portion for connecting said forged body to a drive system, a seal member removably disposed on an outer diameter of said first portion;

a slinger portion integrally and unitarily forged with said forged body for deflecting debris away from said seal member.

10. The axle yoke of claim 9, wherein said slinger portion is defined by a lip projection from said enlarged connecting portion in said axial direction.

11. The axle yoke of claim 9, wherein said slinger portion is defined by a circumferential groove formed into a transitional portion between said first portion and said enlarged connecting portion of said axle yoke, said circumferential groove extending along the axial direction.

12. The axle yoke of claim 11, wherein said seal member is partially disposed within said circumferential groove.

13. The axle yoke of claim 9, wherein said generally annular first portion is formed with internal splines adapted to mate with external splines of an axle shaft.

14. The axle yoke of claim 9, wherein said enlarged connecting portion is formed with connecting forks of a constant velocity joint.

15. The axle yoke of claim 9, wherein said slinger portion is formed on an exterior of said forged body along said axial direction at a transition from said generally annular first portion to said enlarged connecting portion.

16. The axle yoke of claim 9, wherein said seal member is sealing disposed on said exterior diameter adjacent said slinger portion.

* * * * *